United States Patent
Andrade Russian

(10) Patent No.: US 11,599,011 B2
(45) Date of Patent: Mar. 7, 2023

(54) PORTABLE SELF-STANDING CAMERA MOUNTING SYSTEM FOR MOUNTING MULTIPLE CAMERAS

(71) Applicant: Gerardo Antonio Andrade Russian, Acworth, GA (US)

(72) Inventor: Gerardo Antonio Andrade Russian, Acworth, GA (US)

(*) Notice: Subject to any disclaimer, the term of this patent is extended or adjusted under 35 U.S.C. 154(b) by 1 day.

(21) Appl. No.: 17/327,616

(22) Filed: May 21, 2021

(65) Prior Publication Data

US 2021/0364894 A1      Nov. 25, 2021

Related U.S. Application Data

(60) Provisional application No. 63/028,234, filed on May 21, 2020.

(51) Int. Cl.
G03B 17/56      (2021.01)

(52) U.S. Cl.
CPC .................. G03B 17/561 (2013.01)

(58) Field of Classification Search
CPC ....... G03B 17/561; F16G 11/12; F16M 11/22; F16M 13/022
See application file for complete search history.

(56) References Cited

U.S. PATENT DOCUMENTS

| | | | |
|---|---|---|---|
| 4,153,247 A * | 5/1979 | Burns | A63B 61/02 473/416 |
| 5,113,768 A | 5/1992 | Brown | |
| 5,224,426 A | 7/1993 | Rodnunsky et al. | |
| 5,225,863 A | 7/1993 | Weir-Jones | |
| 6,056,450 A | 5/2000 | Walling | |
| 6,886,471 B2 | 5/2005 | Rodnunsky | |
| 6,975,089 B2 | 12/2005 | Rodnunsky et al. | |
| 8,035,893 B2 * | 10/2011 | Creel | G03B 21/58 359/461 |
| 8,199,197 B2 | 6/2012 | Bennett et al. | |
| 8,959,555 B2 | 2/2015 | Monari et al. | |
| 9,066,024 B2 | 6/2015 | Chang et al. | |
| 9,122,130 B1 | 9/2015 | Vegh | |
| 9,123,172 B2 | 9/2015 | Sebring et al. | |

(Continued)

FOREIGN PATENT DOCUMENTS

| EP | 3598228 A1 | 1/2020 |
|---|---|---|
| WO | 2018076065 A1 | 5/2018 |

*Primary Examiner* — Christopher E Mahoney
(74) *Attorney, Agent, or Firm* — Meunier Carlin & Curfman LLC

(57) ABSTRACT

A camera mounting system may include first and second self-standing post assemblies. The first post assembly may include a first post including a first tube extending between bottom and top ends of the first post, and a first base attached to the bottom end of the first post. The second post assembly may include a second post including a second tube extending between bottom and top ends of the second post, a second base attached to the bottom end of the second post, a tension device attached to the second post, and a cable configured to extend between the first and second posts and including a first end portion configured to removably attach to the first post assembly and a second end portion attached to the tension device. The tension device may be configured to adjust tension of the cable between the second post and the first post.

19 Claims, 14 Drawing Sheets

(56) References Cited

U.S. PATENT DOCUMENTS

| | | | |
|---|---|---|---|
| 9,154,673 B2 | 10/2015 | Stone | |
| 9,185,361 B2 | 11/2015 | Curry | |
| 9,500,314 B2 | 11/2016 | Zhang | |
| 9,706,187 B2 | 7/2017 | Ghyme | |
| 10,218,965 B2 | 2/2019 | Irschick et al. | |
| 2007/0064208 A1 | 3/2007 | Giegerich et al. | |
| 2009/0103909 A1 | 4/2009 | Giegerich et al. | |
| 2012/0298937 A1 | 11/2012 | Fisher | |
| 2014/0212214 A1* | 7/2014 | Sloan | E01F 13/12 404/6 |
| 2016/0195798 A1 | 7/2016 | Nenov | |
| 2018/0298633 A1* | 10/2018 | Herman | E04H 17/12 |
| 2018/0302572 A1 | 10/2018 | Barnes | |

\* cited by examiner

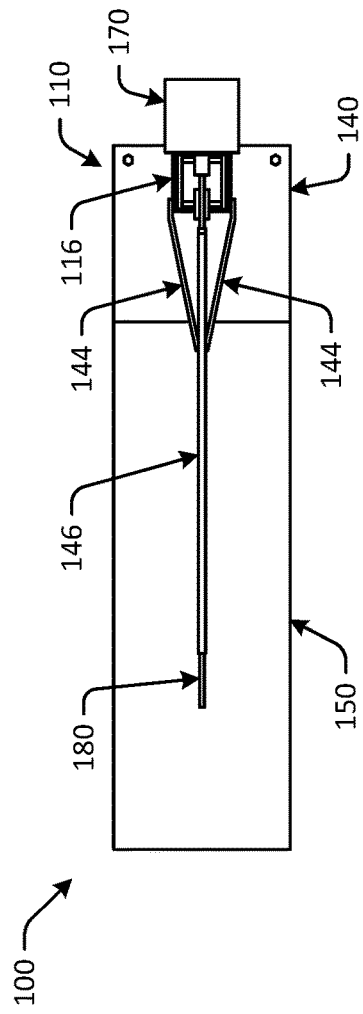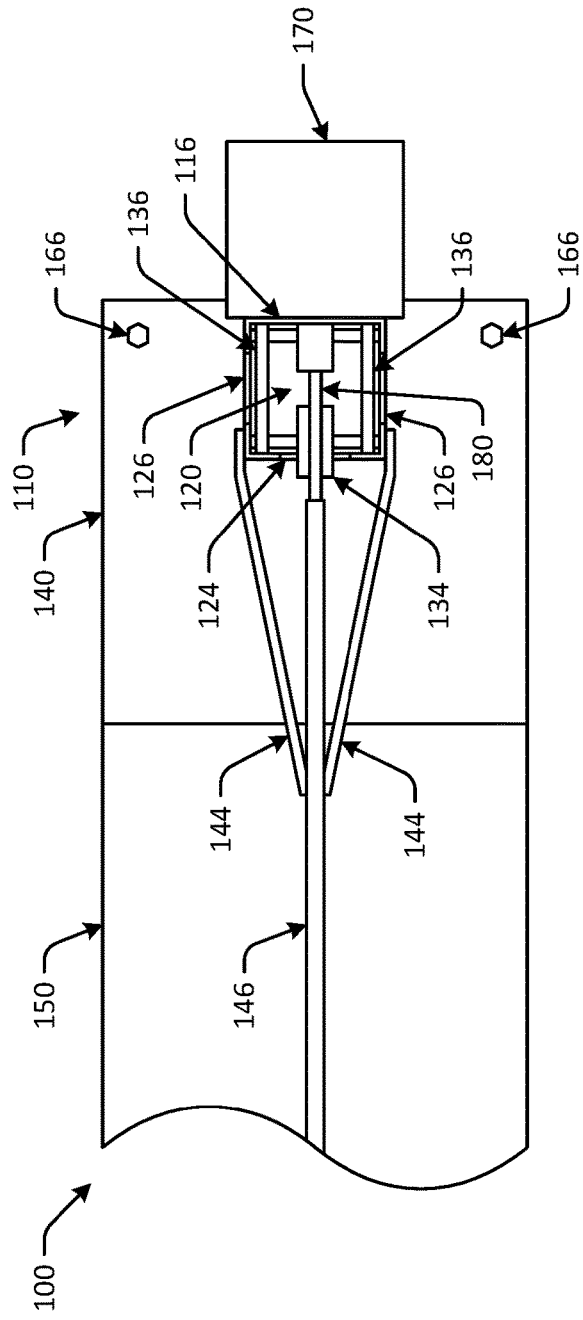

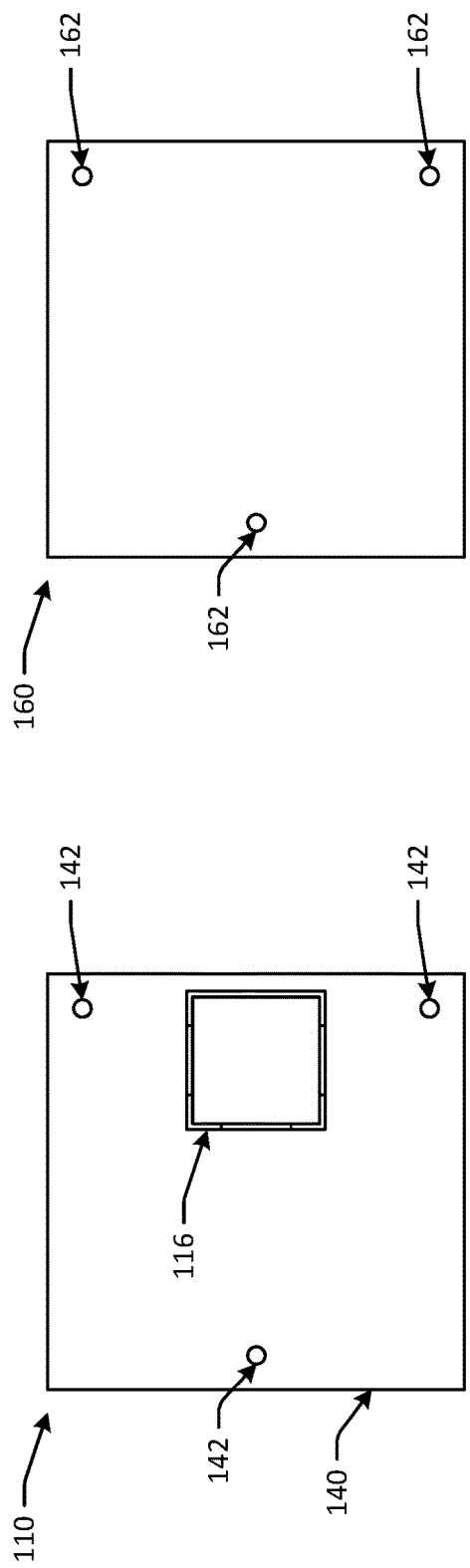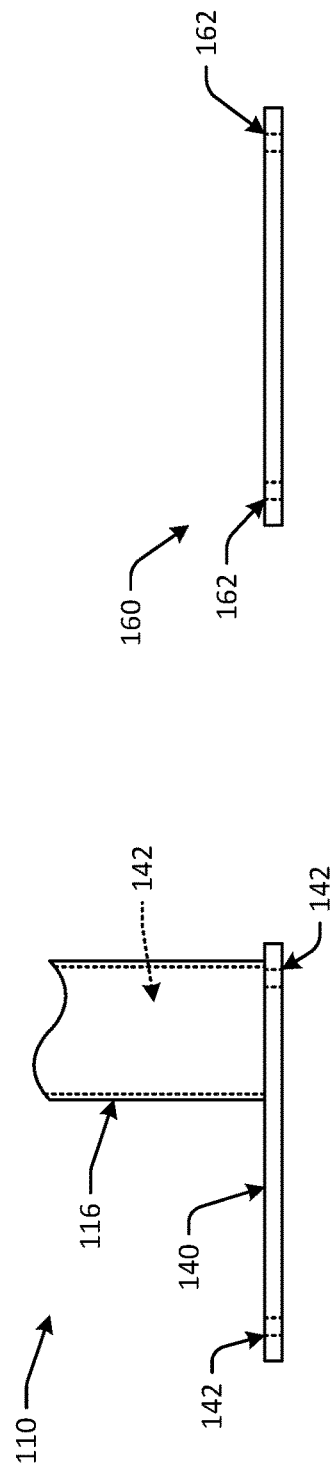

PORTABLE SELF-STANDING CAMERA MOUNTING SYSTEM FOR MOUNTING MULTIPLE CAMERAS

CROSS-REFERENCE TO RELATED APPLICATIONS

This application claims priority to and the benefit of U.S. Provisional Patent Application No. 63/028,234, filed on May 21, 2020, the disclosure of which is expressly incorporated herein by reference in its entirety.

FIELD OF THE DISCLOSURE

The present disclosure relates generally to a camera mounting system and more particularly to a portable self-standing camera mounting system for mounting multiple cameras, which enables capturing multi-view images and videos and is capable of simultaneously shooting multiple matches in sporting events carried out at the same time in a delimited area of a venue.

BACKGROUND OF THE DISCLOSURE

Various types of image and/or video capturing systems and methods have been used for capturing images and/or videos of events. According to one approach, a camera is mounted to a moving platform to provide various different vantage points for capturing images and/or videos of an event carried out at a venue. Another approach involves suspending a movable camera from a number of cables arranged in a venue to provide various different vantage points for capturing images and/or videos of an event. Although these existing approaches may be suitable in some instances, the structures used for supporting and positioning the camera typically are complex, expensive, and difficult to construct and employ.

Moreover, most existing systems and methods for capturing images and/or videos of sporting events are intended for use with respect to a single sporting match or game carried out at a single venue. Accordingly, such systems and methods generally may not be suitable for capturing images and/or videos of multiple matches in sporting events carried out at the same time at a single venue. Examples of this scenario include multiple concurrent fights carried out in adjacent areas during a martial arts tournament, multiple tennis matches carried out on adjacent courts during a tennis championship, and the like.

Furthermore, certain sporting events may be carried out in temporary venues, making it challenging to have a fixed system for mounting and positioning cameras to capture images and/or videos of the events. Additionally, certain venues may be used for various types of sporting events, with the venue being reconfigured for different events. In this manner, a fixed camera mounting system may not allow cameras to be positioned in an optimal arrangement for capturing images and/or videos of a particular sporting event carried out a given time.

A need therefore exists for improved camera mounting systems and methods for mounting and positioning cameras to capture images and/or videos of events, which may overcome one or more of the above-mentioned limitations associated with existing camera mounting systems and methods.

SUMMARY OF THE DISCLOSURE

The present disclosure provides camera mounting systems and related methods for mounting and positioning cameras to capture images and/or videos of events. In one aspect, a camera mounting system is provided. In one embodiment, the camera mounting system may include a first post assembly that is self-standing in an upright position, and a second post assembly that is self-standing in an upright position and movable relative to the first post assembly. The first post assembly may include a first post including a first tube extending between a bottom end and a top end of the first post, and a first base attached to the bottom end of the first post and extending transverse to the first post. The second post assembly may include a second post including a second tube extending between a bottom end and a top end of the second post, a second base attached to the bottom end of the second post and extending transverse to the second post, a first tension device attached to the second post, and a first cable configured to extend between the second post and the first post. The first cable may include a first end portion configured to removably attach to the first post assembly and a second end portion attached to the first tension device. The first tension device may be configured to adjust tension of the first cable between the second post and the first post.

In some embodiments, the second tube may include an inner passage extending therethrough, and the first cable may extend through the inner passage. In some embodiments, the second tube also may include a first opening and a second opening each in communication with the inner passage, and the first cable may extend from the first tension device, through the first opening into the inner passage, and through the second opening out of the inner passage. In some embodiments, the first opening may be positioned closer to the bottom end than the top end of the second post, and the second opening may be positioned closer to the top end than the bottom end of the second post. In some embodiments, the second post assembly also may include a first pulley and a second pulley each attached to the second tube and positioned at least partially within the inner passage, and the first cable may extend from the first tension device, around the first pulley, and around the second pulley. In some embodiments, the first pulley may be positioned closer to the bottom end than the top end of the second post, and the second pulley may be positioned closer to the top end than the bottom end of the second post. In some embodiments, the first pulley may extend through the first opening, and the second pulley may extend through the second opening. In some embodiments, the first pulley may be positioned along a first side of the second tube, and the second pulley may be positioned along an opposite second side of the second tube. In some embodiments, the second post assembly also may include a pair of support arms attached to the second tube and positioned about the second opening, and a support tube attached to the support arms. The support arms may extend transverse to the second tube, and the first cable may extend through the support tube.

In some embodiments, the second post also may include a post plate positioned at the bottom end of the second post and attached to the second tube, and the post plate may have a greater cross-sectional area than the second tube. In some embodiments, the second base may include a base plate attached to the post plate by a plurality of fasteners, and the base plate may have a greater cross-sectional area than the post plate. In some embodiments, the second post assembly also may include a plurality of counterweights attached to the second post. In some embodiments, the plurality of counterweights may include a plurality of counterweight plates positioned between the post plate and the base plate and attached to the post plate by a plurality of fasteners. In some embodiments, the plurality of counterweights may include a plurality of fluid containers positioned at least partially over the post plate. In some embodiments, the second post assembly also may include a plurality of cable supports attached to the second tube and positioned along the top end of the second post. The cable supports may be configured to engage a second cable. In some embodiments, the plurality of cable supports may include a plurality of cylindrical pins. In some embodiments, the first tension device may include a winch. In some embodiments, the camera mounting system also may include a plurality of cameras. Each camera may be configured to attach to the first cable at a fixed location along the first cable between the second post and the first post.

In some embodiments, the camera mounting system also may include a third post assembly that is self-standing in an upright position and movable relative to each of the first post assembly and the second post assembly such that the third post assembly is positioned between the first post assembly and the second post assembly. The third post assembly may include a third post including a third tube extending between a bottom end and a top end of the third post, a third base attached to the bottom end of the third post and extending transverse to the third post, and a plurality of cable supports attached to the third tube and positioned along the top end of the third post. The cable supports may be configured to engage the first cable of the second post assembly while the first cable extends between the second post and the first post. In some embodiments, the third post assembly also may include a second tension device attached to the third post, and a second cable configured to extend between the third post and a fourth post of a fourth post assembly. The second cable may include a first end portion configured to removably attach to the fourth post assembly and a second end portion attached to the second tension device. The second tension device may be configured to adjust tension of the second cable between the third post and the fourth post.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 6B is a top view of the post assembly of FIG. 6A.

FIG. 6C is a detailed top view of a portion of the post assembly of FIG. 6A.

FIG. 6N is a detailed top view of the post of the post assembly of FIG. 6A.

FIG. 6O is a detailed side view of a portion of the post of the post assembly of FIG. 6A.

FIG. 6P is a detailed top view of one of the counterweights of the post assembly of FIG. 6A.

FIG. 6Q is a detailed side view of one of the counterweights of the post assembly of FIG. 6A.

Figure 1:
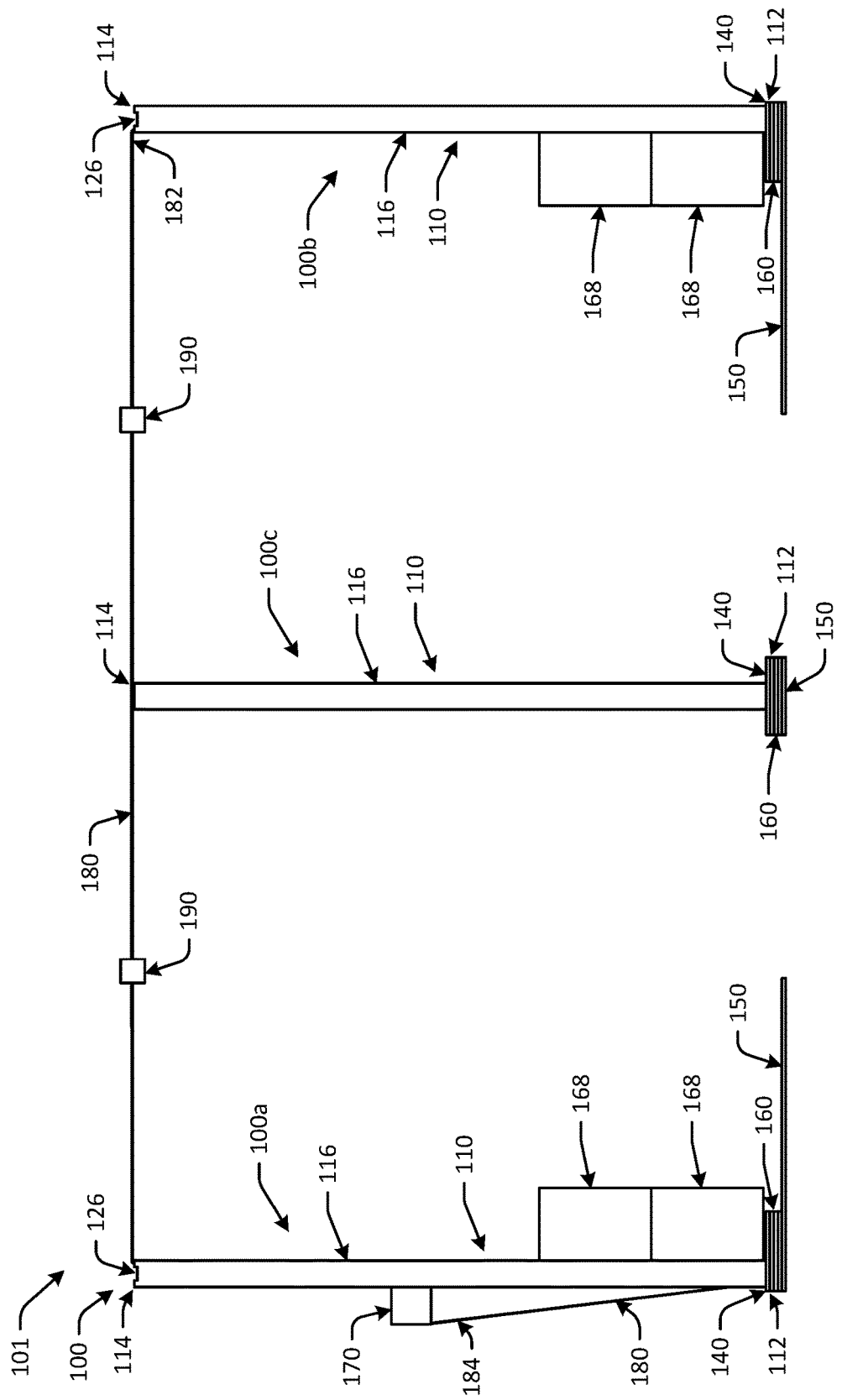
FIG. 1 is a front view of a portable self-standing camera mounting system in accordance with one or more embodiments of the disclosure, showing a single row of post assemblies of the camera mounting system.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, and components have not been described in detail so as not to unnecessarily obscure aspects of the embodiments.

Overview

Embodiments of portable self-standing camera mounting systems and related methods for mounting and positioning cameras to capture images and/or videos of events are provided herein. As described below, a camera mounting system may be provided as a self-standing structure that utilizes cables to which a plurality of high definition cameras are removably mounted at specific fixed locations (i.e., when mounted, the cameras do not slide along the cables). In use, the cables may extend over an event area such that the cameras mounted thereto may capture multi-view images and videos of multiple different areas of a venue. In this manner, the camera mounting system may be used to simultaneously capture multi-view images and videos of multiple matches in sporting events carried out at the same time in a delimited area of a venue. Examples of such sporting events include multiple concurrent fights carried out in adjacent areas during a martial arts tournament, multiple tennis matches carried out on adjacent courts during a tennis championship, and the like. It will be appreciated, however, that the camera mounting system may be used for various other types of events to simultaneously capture multi-view images and videos of multiple different areas of an overall venue.

The camera mounting system solves the problem of recording multiple events occurring simultaneously in a temporary venue of large or small dimension where it was otherwise not possible without fixing permanent structures or using multiple heavy cameras with operators. As discussed below, the camera mounting system may include a plurality of spaced apart post assemblies and a plurality of cables extending between respective post assemblies in an elevated manner with respect to the floor or ground of a venue. In this manner, the cables and the camera may be positioned over the event area without obstructing the event or view of the spectators. During use, the cameras may be remotely operated by a computer and may continuously record the entire area of interest.

The camera mounting system described herein may be readily assembled and disassembled such that the entire system may be transported from one venue to another. For example, the cables may be easily detached from respective post assemblies such that each post assembly may be separately moved. Moreover, portions of each post assembly may be detached from one another to ease transport of the camera mounting system. Furthermore, the camera mounting system offers flexibility in arrangement of the post assemblies and the cables. In this manner, the shape and size of the event area covered by the camera mounting system may be tailored to the particular event at hand. Additionally, the camera mounting system may accommodate any number of cameras mounted to the cables. In this manner, the number of cameras used may be selected based on the number of discrete areas to be covered and the number of different views desired for each discrete area.

Still other aspects, benefits, and advantages of the portable self-standing camera mounting systems and related methods provided herein over existing technology will be appreciated by those of ordinary skill in the art from the following description and the appended drawings.

Example Embodiments of Camera Mounting Systems

Referring now to FIGS. 1-5, example portable self-standing camera mounting systems 101, 102, 103, 104, 105 (which also may be referred to as "camera mounting systems" or simply "systems") are depicted. Each camera mounting system 101, 102, 103, 104, 105 generally may include a plurality of post assemblies 100 with at least one cable 180. In some embodiments, a plurality of cables 180 may be used. As noted above, the camera mounting systems 101, 102, 103, 104, 105 allow for the post assemblies 100 and cables 180 to be arranged in a variety of different arrangements to suit a particular event space.

FIG. 1 shows a camera mounting system 101 including three post assemblies 100 arranged in a single row, with a single cable 180 extending between the post assemblies 100. As shown, the system 101 may include a starting post assembly 100a, an end post assembly 100b, and a middle post assembly 100c positioned between the starting post assembly 100a and the end post assembly 100b to form the row. The cable 180 may extend from the starting post assembly 100a, over the middle post assembly 100c, and to the end post assembly 100b. In some embodiments, each of the post assemblies 100a, 100b, 100c may have an identical configuration. In other words, a single universal post assembly 100 configuration may be used for each of the post assemblies 100a, 100b, 100c, although certain components of the post assembly 100 may not be needed depending on the relative positioning of the post assembly 100 (i.e., whether it is used as a starting post assembly 100a, an end post assembly 100b, or a middle post assembly 100c). In other embodiments, each of the post assemblies 100a, 100b, 100c may be designed for use at a particular position within an arrangement of the system 101. In other words, the post assemblies 100a, 100b, 100c may have different configurations relative to one another, with each post assembly 100 including only the components needed for its intended relative positioning (i.e., whether it is intended to be used as a starting post assembly 100a, an end post assembly 100b, or a middle post assembly 100c). A detailed description of embodiments of the post assembly 100 is provided below with reference to FIGS. 6A-6F. Various arrangements of the system 101 may be used, with fewer or more post assemblies 100. The system 101 may include a plurality of cameras 190 mounted to the cable 180 at fixed locations (i.e., when mounted, the cameras 190 do not slide along the cable 180) between respective post assemblies 100. For example, as shown, the system 101 may include a first camera 190 mounted between the starting post assembly 100a and the middle post assembly 100c, and a second camera 190 mounted between the end post assembly 100b and the middle post assembly 100c. Any number of cameras 190 may be mounted at any location along the cable 180.

Figure 2:
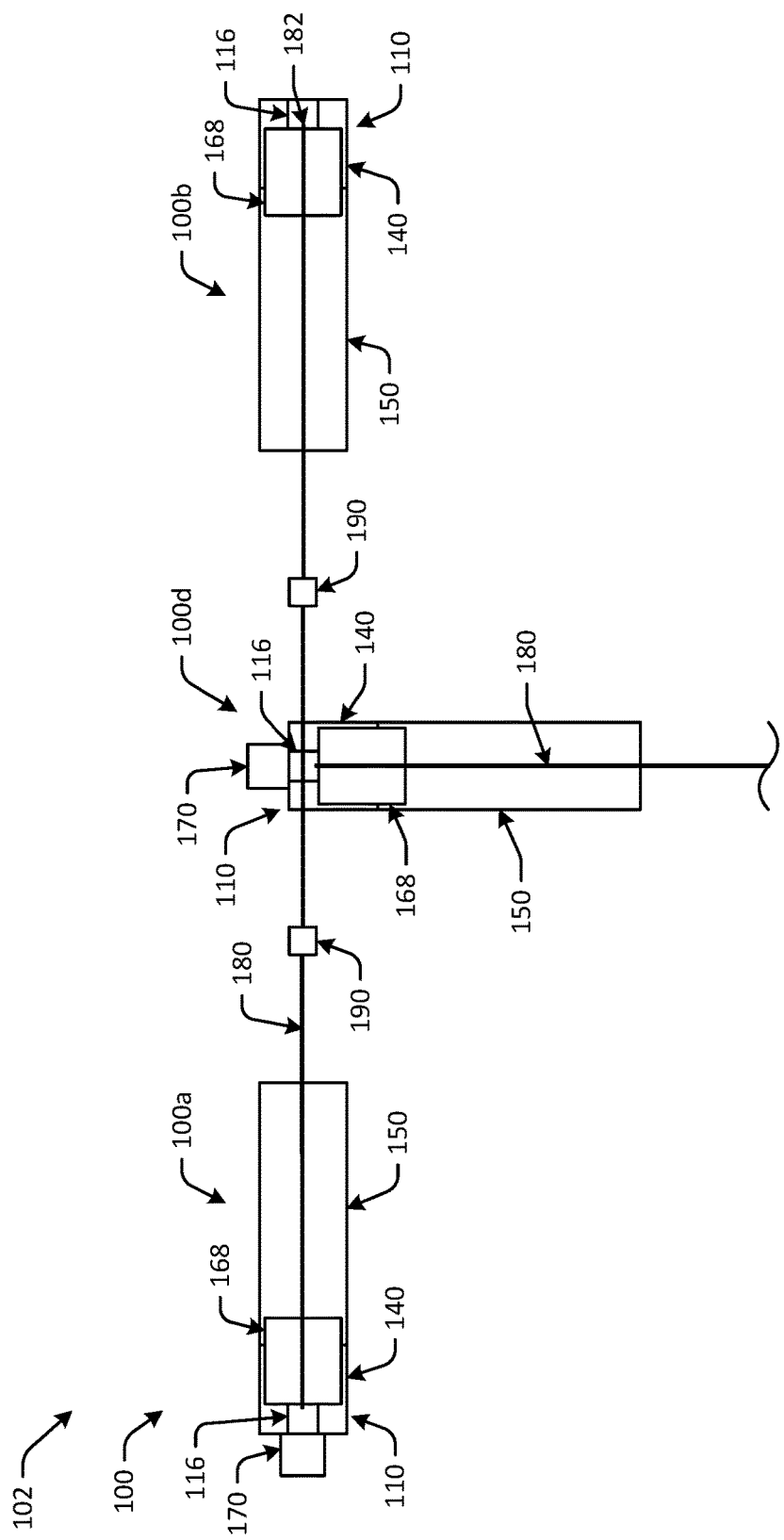
FIG. 2 is a top view of a portable self-standing camera mounting system in accordance with one or more embodiments of the disclosure, showing a single row of post assemblies of the camera mounting system.

FIG. 2 shows a camera mounting system 102 including three post assemblies 100 arranged in a single row, with a first cable 180 extending between the post assemblies 100 and a second cable 180 extending transverse to the first cable 180. The second cable 180 may extend to yet another post assembly 100 (not shown in FIG. 2). As shown, the system 102 may include a starting post assembly 100a, an end post assembly 100b, and a starting middle post assembly 100d positioned between the starting post assembly 100a and the end post assembly 100b to form the row. The first cable 180 may extend from the starting post assembly 100a, over the starting middle post assembly 100d, and to the end post assembly 100b. In some embodiments, the second cable 180 may extend from the starting middle post assembly 100d to another end post assembly 100b (not shown). Further, in some embodiments, the second cable 180 may extend from the starting middle post assembly 100d, over a middle post assembly 100c (not shown), and to another end post assembly 100b (not shown). Various arrangements of the system 102 may be used, with fewer or more post assemblies 100. The system 102 may include a plurality of cameras 190 mounted to the first cable 180 at fixed locations between respective post assemblies 100. For example, as shown, the system 102 may include a first camera 190 mounted between the starting post assembly 100a and the starting middle post assembly 100d, and a second camera 190 mounted between the end post assembly 100b and the starting middle post assembly 100d. Further, additional cameras 190 may be mounted to the second cable 180 between the starting middle post assembly 100d and another post assembly 100. Any number of cameras 190 may be mounted at any location along the cables 180.

Figure 3:
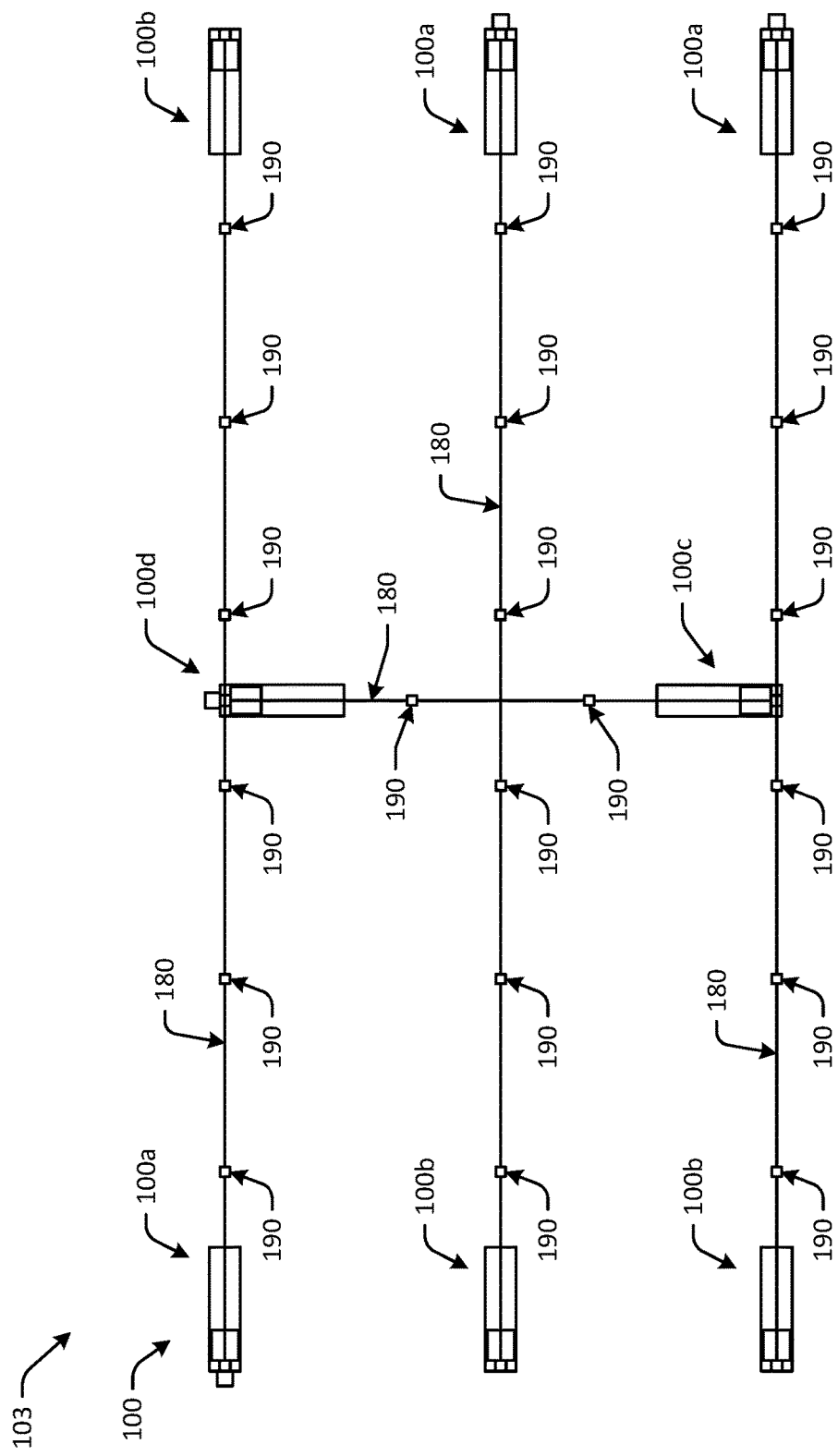
FIG. 3 is a top view of a portable self-standing camera mounting system in accordance with one or more embodiments of the disclosure, showing an array of post assemblies of the camera mounting system.

FIG. 3 shows a camera mounting system 103 including eight post assemblies 100 arranged in an array having three rows and three columns, with four cables 180 extending between respective post assemblies. As shown, a first row (the "bottom" row in the view of FIG. 3) of the system 103 may include a starting post assembly 100a, an end post assembly 100b, and a middle post assembly 100c positioned between the starting post assembly 100a and the end post assembly 100b to form the row. A first cable 180 may extend from the starting post assembly 100a, over the middle post assembly 100c, and to the end post assembly 100b. A second row (the "middle" row in the view of FIG. 3) of the system 103 may include a starting post assembly 100 and an end post assembly 100b to form the row. A second cable 180 may extend from the starting post assembly 100a to the end post assembly 100b. A third row (the "top" row as illustrated in FIG. 3) of the system 103 may include a starting post assembly 100a, an end post assembly 100b, and a starting middle post assembly 100d positioned between the starting post assembly 100a and the end post assembly 100b to form the row. A third cable 180 may extend from the starting post assembly 100a, over the starting middle post assembly 100d, and to the end post assembly 100b. As shown, the post assemblies 100 of the system 103 also may be viewed as being arranged in columns formed by two or more of the post assemblies 100. For example, a first column (the "left" column as illustrated in FIG. 3) of the system 103 may include the end post assembly 100b of the first row, the end post assembly of the second row, and the starting post assembly 100a of the third row. Similarly, a second column (the "middle" column as illustrated in FIG. 3) of the system 103 may include the middle post assembly 100c of the first row and the starting middle post assembly 100d of the third row. As shown, a fourth cable 180 may extend from the starting middle post assembly 100d to the middle post assembly 100c. In some embodiments, the fourth cable 180 may be positioned below the second cable 180. In this manner, the fourth cable 180 may provide a support function for the second cable 180, minimizing drop of the second cable 180 due to a lack of a middle post assembly 100c in the second row. Various arrangements of the system 103 may be used, with fewer or more post assemblies 100 and/or fewer or more cables 180. The system 103 may include a plurality of cameras 190 mounted to the cables 180 at fixed locations between respective post assemblies 100. For example, as shown, the system 102 may include three cameras 190 mounted to the first cable 180 between the starting post assembly 100a and the middle post assembly 100c of the first row, three cameras 190 mounted to the first cable 180 between the end post assembly 100b and the middle post assembly 100c of the first row, three cameras 190 mounted to the second cable 180 between the starting post assembly 100a of the second row and the fourth cable 180, three cameras 190 mounted to the second cable 180 between the end post assembly 100b of the second row and the fourth cable 180, include three cameras 190 mounted to the third cable 180 between the starting post assembly 100a and the starting middle post assembly 100d of the third row, three cameras 190 mounted to the third cable 180 between the end post assembly 100b and the starting middle post assembly 100d of the third row, one camera 190 mounted to the fourth cable 180 between the middle post assembly 100c of the first row and the second cable 180, and one camera 190 mounted to the fourth cable 180 between the starting middle post assembly 100d of the third row and the second cable 180. Any number of cameras 190 may be mounted at any location along the cables 180.

Figure 4:
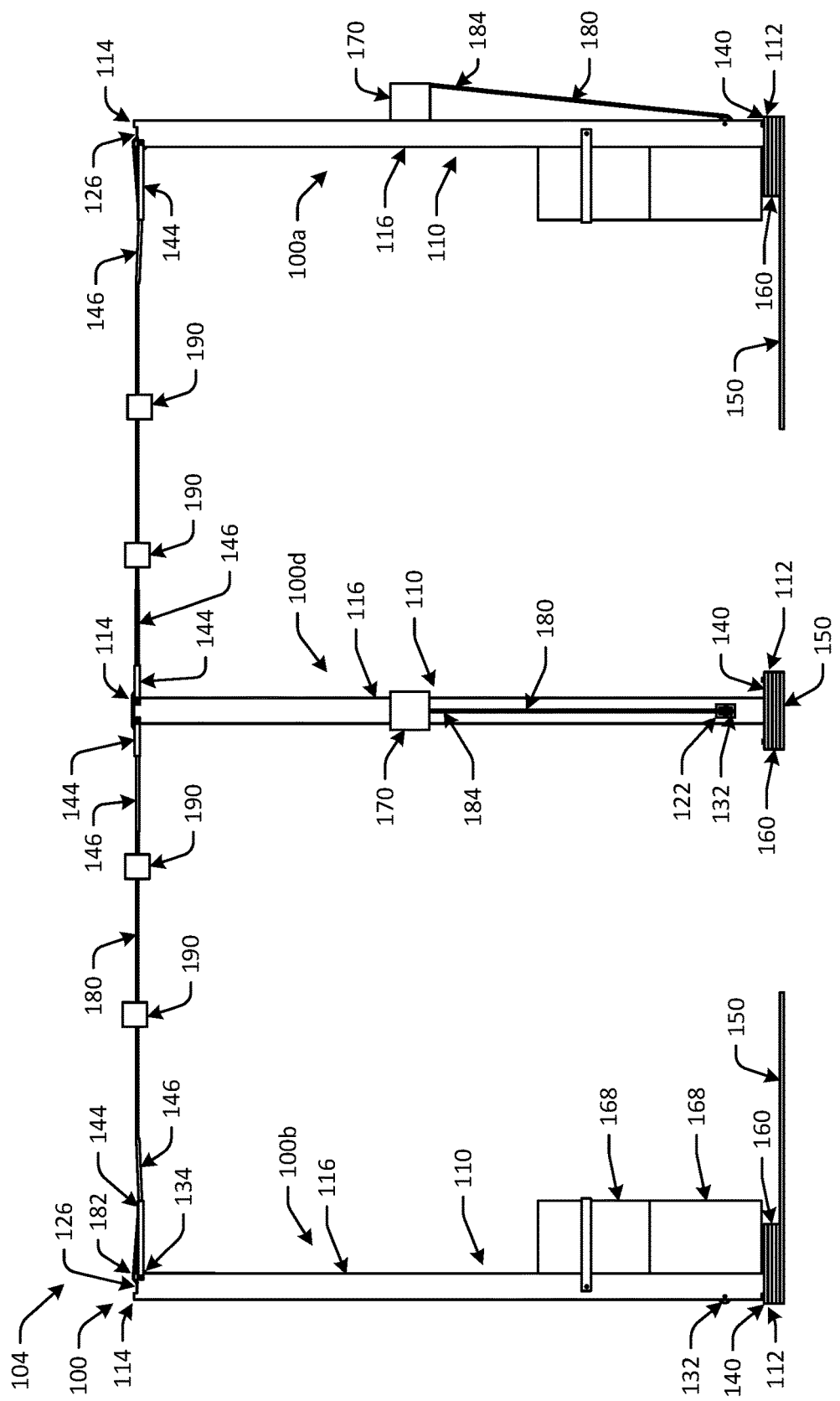
FIG. 4 is a front view of a portable self-standing camera mounting system in accordance with one or more embodiments of the disclosure, showing a single row of post assemblies of the camera mounting system.

FIG. 4 shows a camera mounting system 104 including three post assemblies 100 arranged in a single row, with a single cable 180 extending between the post assemblies 100. As shown, the system 104 may include a starting post assembly 100a, an end post assembly 100b, and a starting middle post assembly 100d positioned between the starting post assembly 100a and the end post assembly 100b to form the row. The cable 180 may extend from the starting post assembly 100a, over the middle post assembly 100c, and to the end post assembly 100b. In some embodiments, each of the post assemblies 100a, 100b, 100c may have an identical configuration. In other words, a single universal post assembly 100 configuration may be used for each of the post assemblies 100a, 100b, 100c, although certain components of the post assembly 100 may not be needed depending on the relative positioning of the post assembly 100 (i.e., whether it is used as a starting post assembly 100a, an end post assembly 100b, or a middle post assembly 100c). In other embodiments, each of the post assemblies 100a, 100b, 100c may be designed for use at a particular position within an arrangement of the system 104. In other words, the post assemblies 100a, 100b, 100c may have different configurations relative to one another, with each post assembly 100 including only the components needed for its intended relative positioning (i.e., whether it is intended to be used as a starting post assembly 100a, an end post assembly 100b, or a middle post assembly 100c). Various arrangements of the system 104 may be used, with fewer or more post assemblies 100. The system 104 may include a plurality of cameras 190 mounted to the cable 180 at fixed locations between respective post assemblies 100. For example, as shown, the system 104 may include two cameras 190 mounted between the starting post assembly 100a and the starting middle post assembly 100d, and a two cameras 190 mounted between the end post assembly 100b and the starting middle post assembly 100d. Any number of cameras 190 may be mounted at any location along the cable 180.

Figure 5:
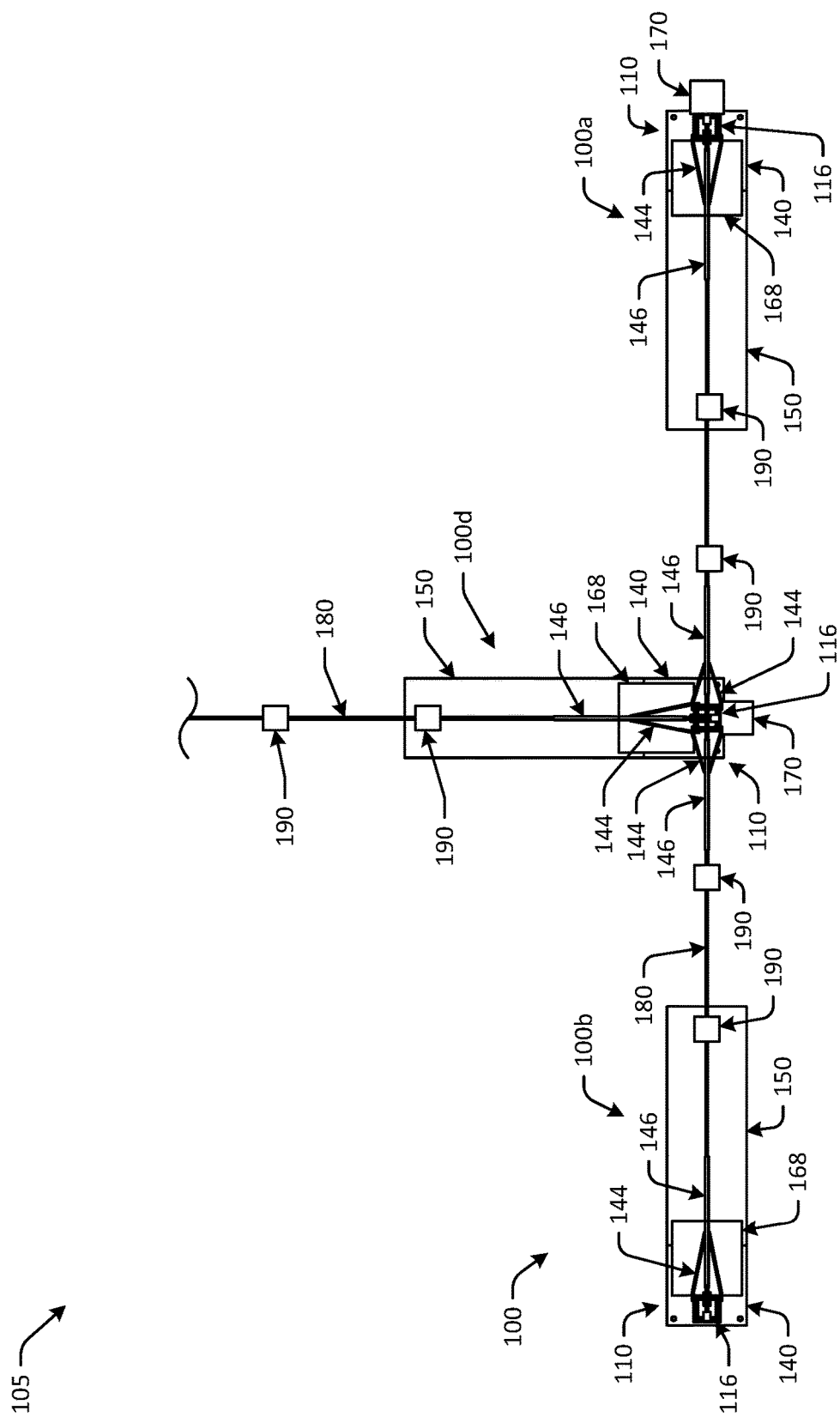
FIG. 5 is a top view of a portable self-standing camera mounting system in accordance with one or more embodiments of the disclosure, showing a single row of post assemblies of the camera mounting system.

FIG. 5 shows a camera mounting system 105 including three post assemblies 100 arranged in a single row, with a first cable 180 extending between the post assemblies 100 and a second cable 180 extending transverse to the first cable 180. The second cable 180 may extend to yet another post assembly 100 (not shown in FIG. 5). As shown, the system 105 may include a starting post assembly 100a, an end post assembly 100b, and a starting middle post assembly 100d positioned between the starting post assembly 100a and the end post assembly 100b to form the row. The first cable 180 may extend from the starting post assembly 100a, over the starting middle post assembly 100d, and to the end post assembly 100b. In some embodiments, the second cable 180 may extend from the starting middle post assembly 100d to another end post assembly 100b (not shown). Further, in some embodiments, the second cable 180 may extend from the starting middle post assembly 100d, over a middle post assembly 100c (not shown), and to another end post assembly 100b (not shown). Various arrangements of the system 105 may be used, with fewer or more post assemblies 100. The system 105 may include a plurality of cameras 190 mounted to the first cable 180 at fixed locations between respective post assemblies 100. For example, as shown, the system 105 may include two cameras 190 mounted between the starting post assembly 100a and the starting middle post assembly 100d, and two cameras 190 mounted between the end post assembly 100b and the starting middle post assembly 100d. Further, two additional cameras 190 may be mounted to the second cable 180 between the starting middle post assembly 100d and another post assembly 100. Any number of cameras 190 may be mounted at any location along the cables 180.

Figure 6A:
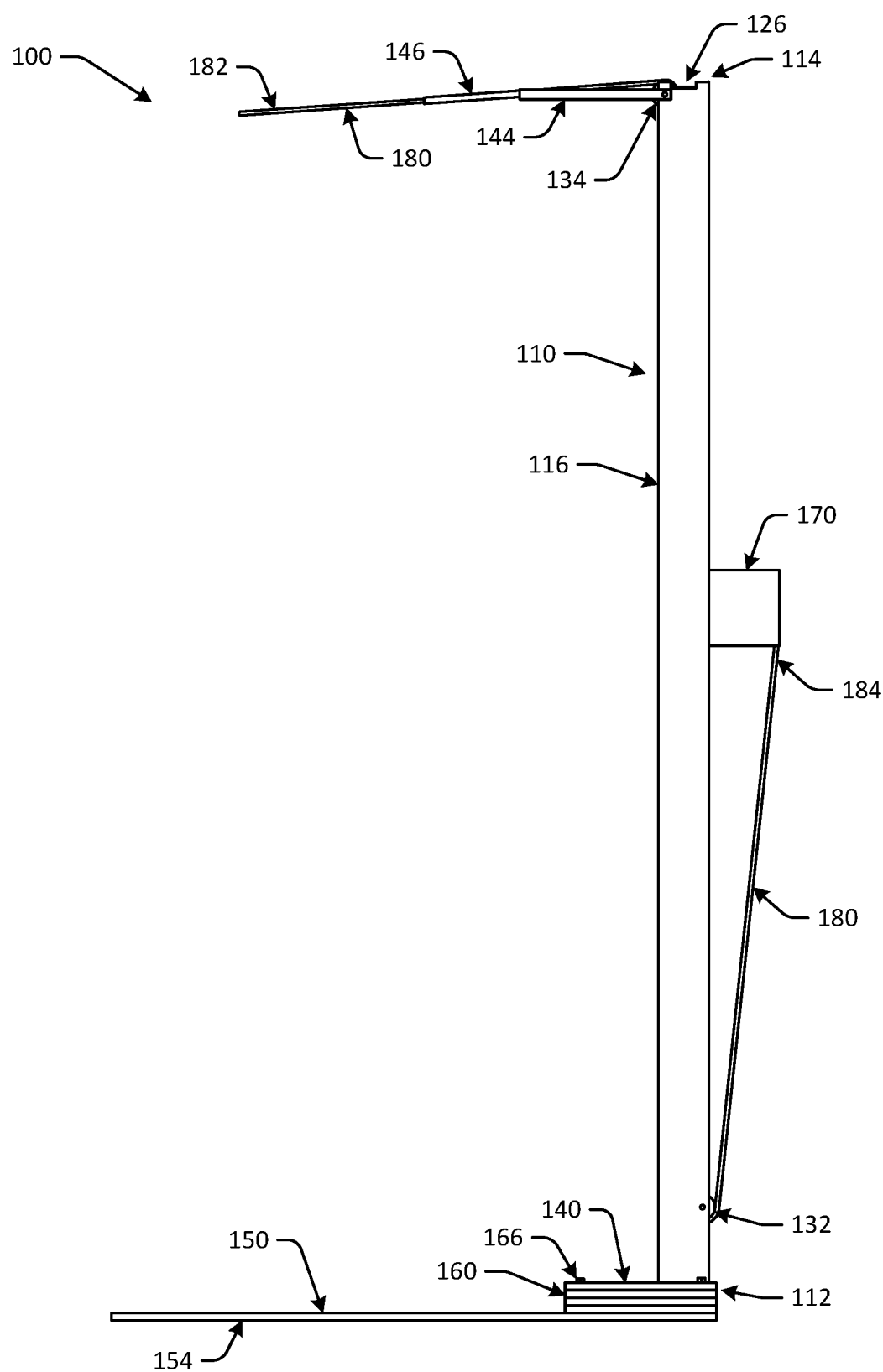
FIG. 6A is a side view of a portable self-standing post assembly for use in a camera mounting system in accordance with one or more embodiments of the disclosure, showing a post, a base, a tension device, a cable, a plurality of pulleys, a plurality of counterweights, a plurality of support arms, and a support tube of the post assembly.
Figure 6E:
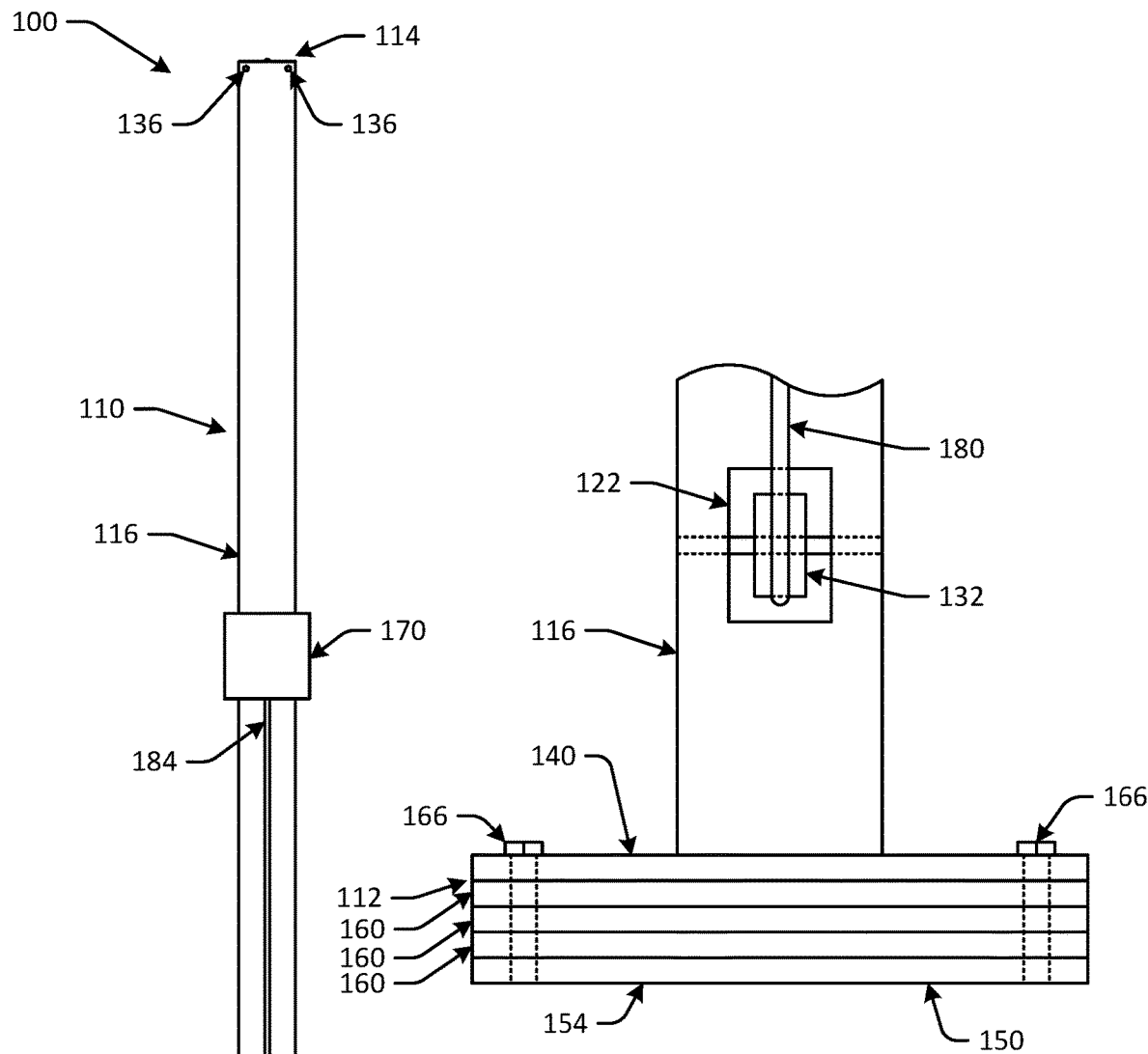
FIG. 6E is a detailed back view of a portion of the post assembly of FIG. 6A.
Figure 6D:
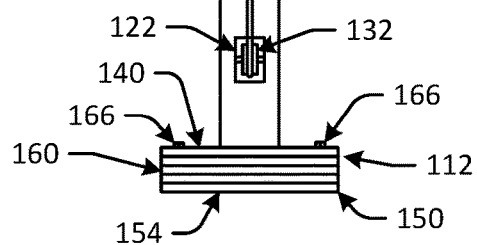
FIG. 6D is a back view of the post assembly of FIG. 6A.
Figure 6G:
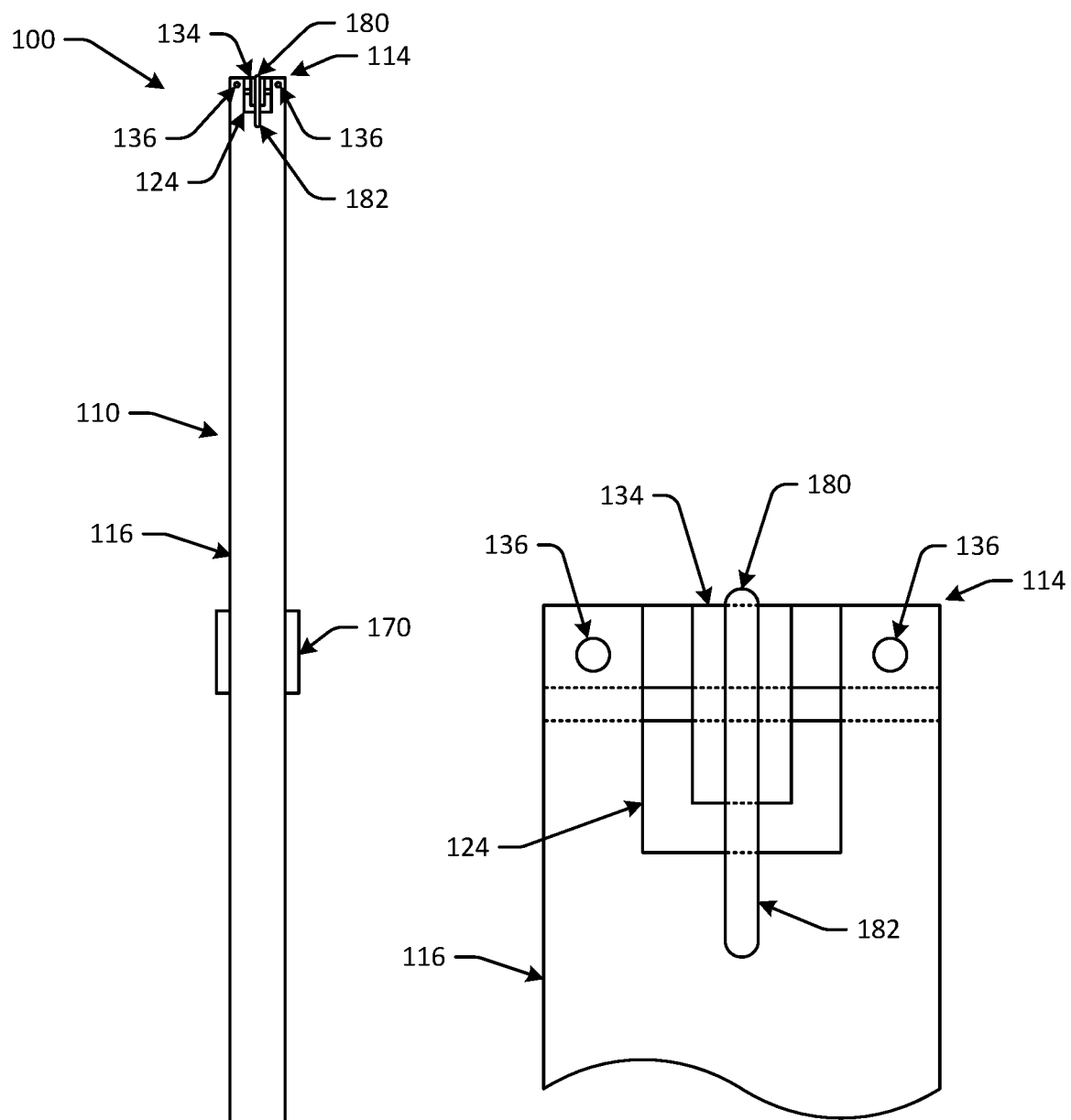
FIG. 6G is a detailed front view of a portion of the post assembly of FIG. 6A.
Figure 6F:
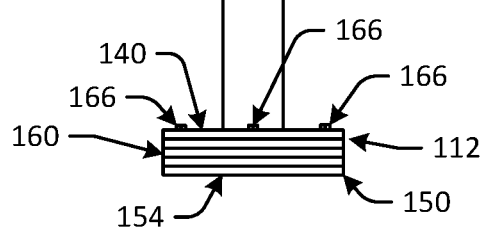
FIG. 6F is a front view of the post assembly of FIG. 6A, with the support arms and the support tube omitted for purposes of illustration.
Figures 6H, 6I:
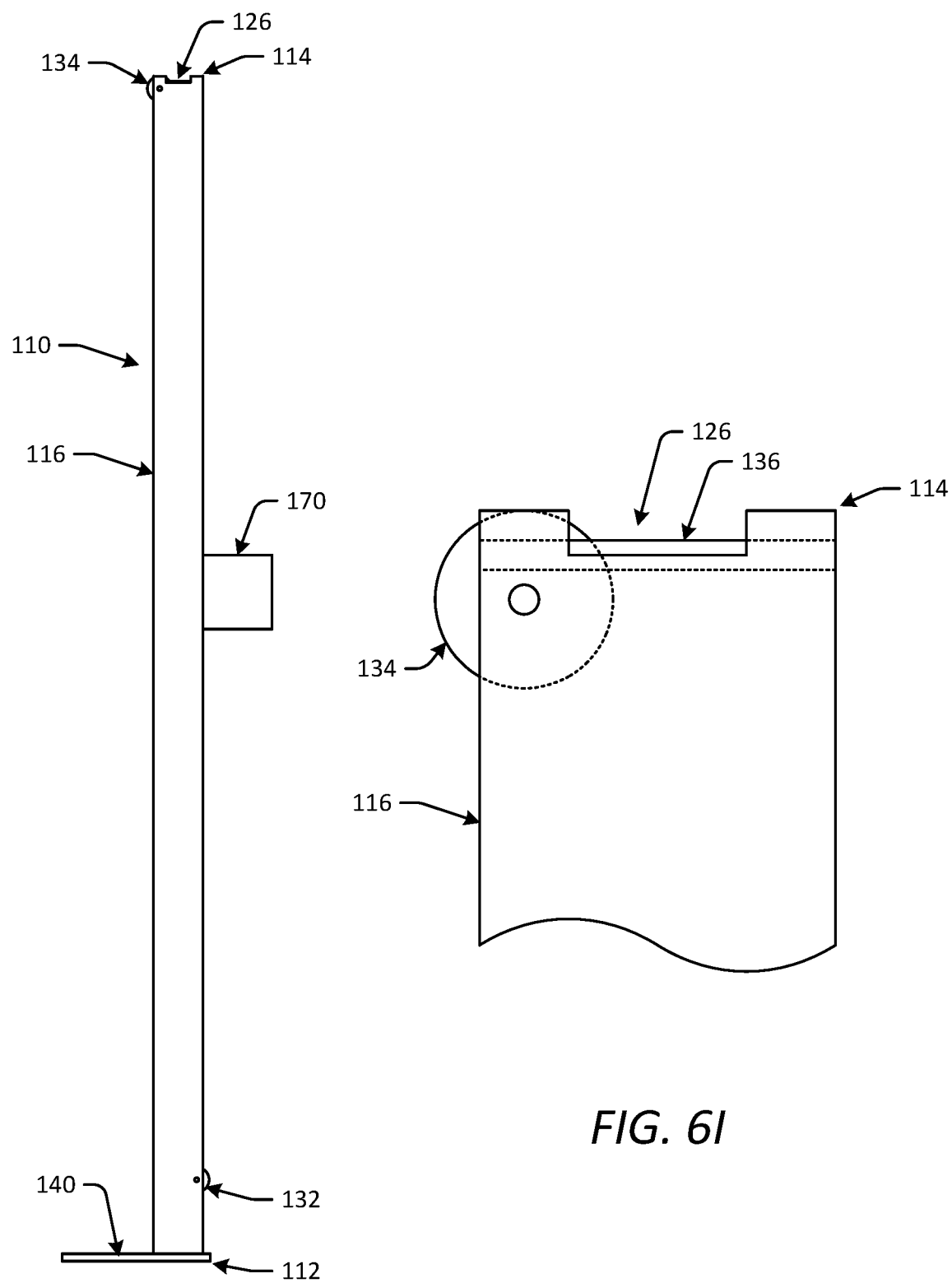
FIG. 6H is a side view of the post, the tension device, and the pulleys of the post assembly of FIG. 6A.
FIG. 6I is a detailed side view of a portion of the post, one of the pulleys, and a plurality of support pins of the post assembly of FIG. 6A.
Figures 6J, 6K:
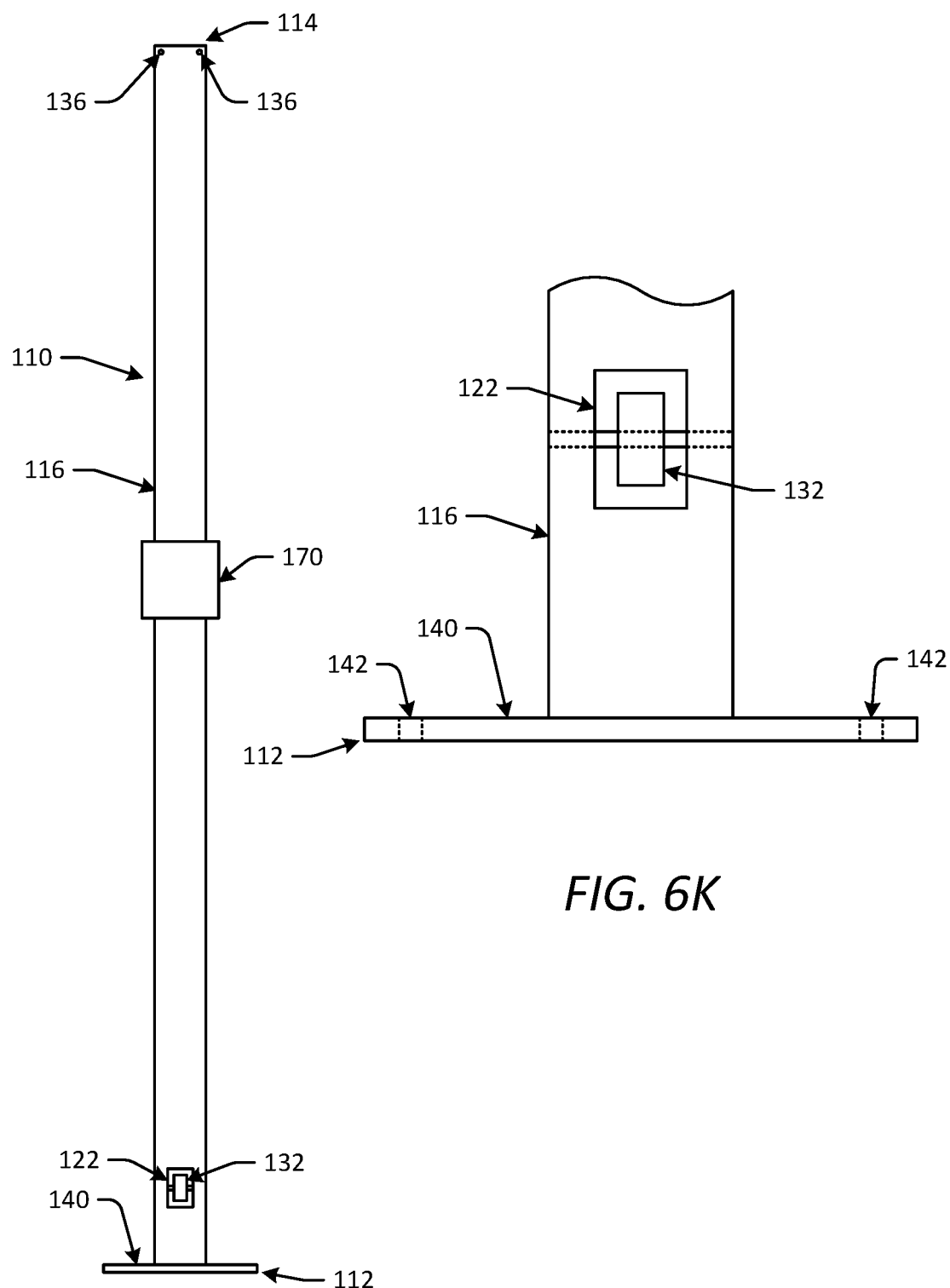
FIG. 6J is a back view of the post, the tension device, and one of the pulleys of the post assembly of FIG. 6A.
FIG. 6K is a detailed back view of a portion of the post and one of the pulleys of the post assembly of FIG. 6A.
Figures 6L, 6M:
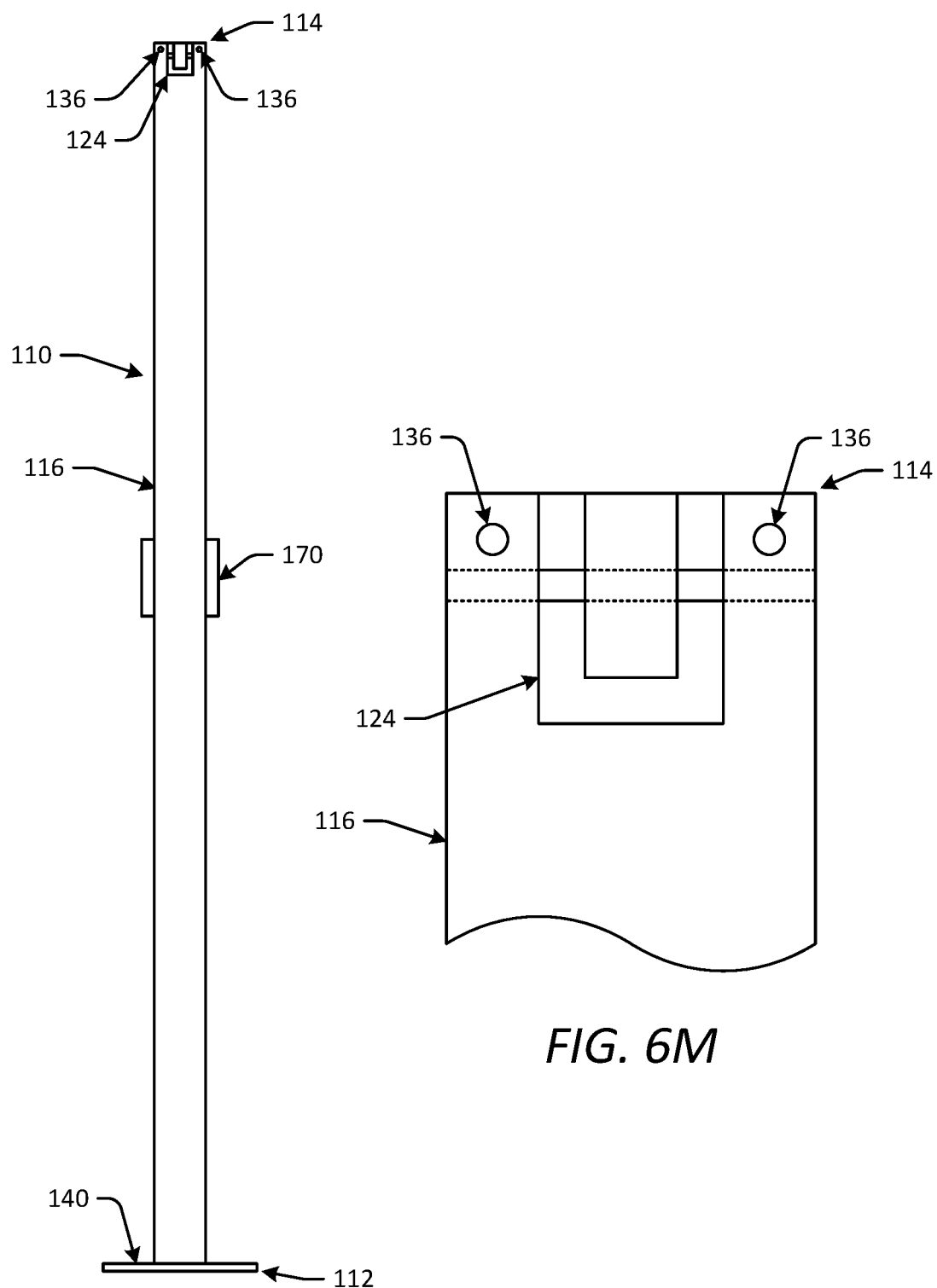
FIG. 6L is a front view of the post, the tension device, and one of the pulleys of the post assembly of FIG. 6A.
FIG. 6M is a detailed front view of a portion of the post, one of the pulleys, and the support pins of the post assembly of FIG. 6A.
Figure 6R:
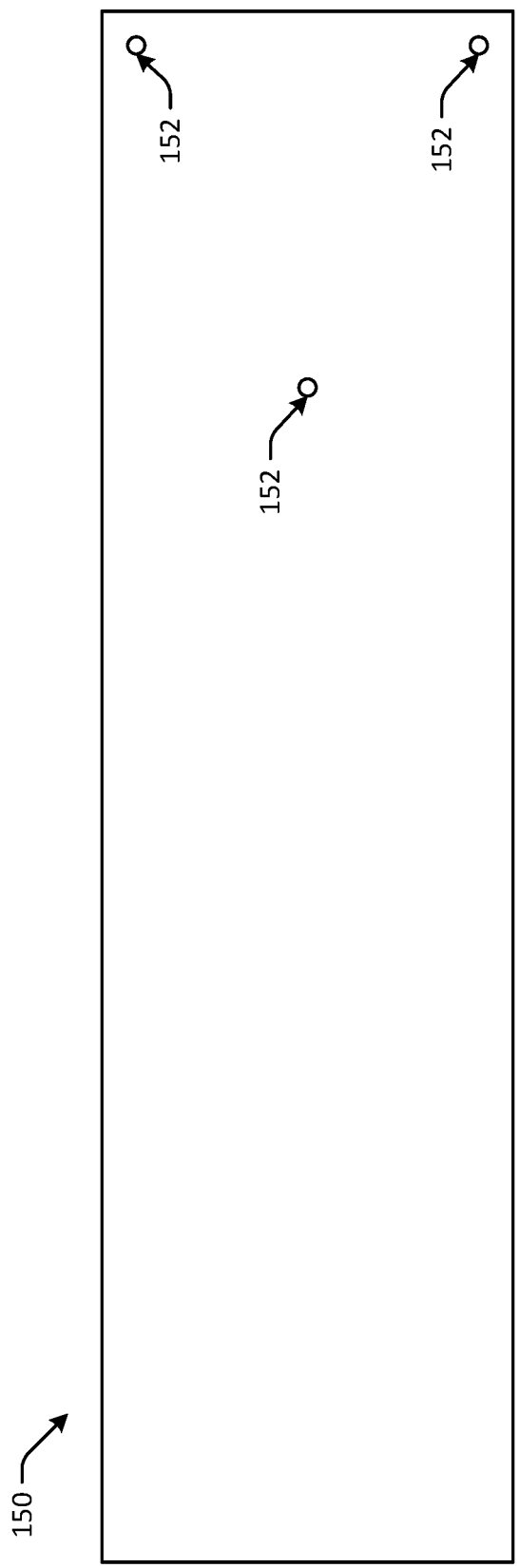
FIG. 6R is a detailed top view of the base of the post assembly of FIG. 6A.
Figure 6S:
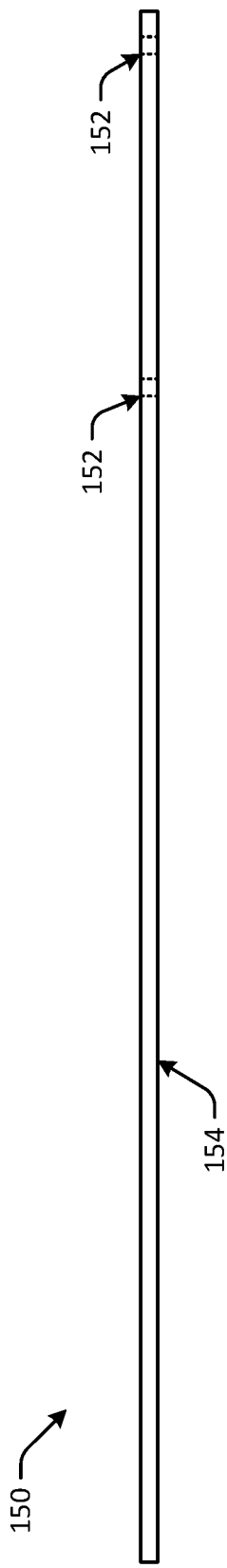
FIG. 6S is a detailed side view of the base of the post of the post assembly of FIG. 6A.

FIGS. 6A-6S illustrate an example post assembly 100 (which also may be referred to as "self-standing post assembly" or simply an "assembly") as may be used in any of the portable self-standing camera mounting systems 101, 102, 103, 104, 105 described above. The post assembly 100 may be self-standing in an upright position, as shown in FIG. 6A. The post assembly 100 generally may include a post 110, a base 150, one or more counterweights 160, a tension device 170, and a cable 180. In some embodiments, the tension device 170 and the cable 180 may be omitted, such as when the post assembly 100 is intended to be used as an end post assembly 100b or a middle post assembly 100c.

As shown, the post 110 may have an elongated shape with a bottom end 112 (which also may be referred to as a "first end") and a top end 114 (which also may be referred to as a "first end") disposed opposite one another. The post 110 may include a tube 116 extending between the bottom end 112 and the top end 114, and a post plate 140 positioned at the bottom end 112 of the post 110. In this manner, the tube 116 may have an inner passage 120 extending therethrough. In some embodiments, as shown, the tube 116 may be a square tube, although other cross-sectional shapes of the tube 116 may be used in other embodiments. As shown, the tube 116 may include a first opening 122 and a second opening 124 each in communication with the inner passage 120. The first opening 122 may be positioned closer to the bottom end 112 than the top end 114, and the second opening 124 may be positioned closer to the top end 114 than the bottom end 112. In some embodiments, as shown, the first opening 122 may be positioned near but spaced apart from the bottom end 112. In some embodiments, as shown, the second opening 124 may extend to the top end 114 and also may extend through a sidewall of the tube 116 adjacent the top end 114. As described below, the openings 122, 124 may allow the cable 180 to pass into and out of the inner passage 120. As shown, the tube 116 also may include a pair of cutouts 126 extending to the top end 114 and defined in opposite lateral sidewalls of the tube 116. As described below, the cutouts 126 may receive a cable 180 of another post assembly 100 therethrough. In some embodiments, the post 110 may be formed of a metal, such as a heavy metal capable of withstanding tensional forces applied to the cable 180 during use without bending or deforming the post 110.

A plurality of pulleys may be attached to the tube 116. As shown, a first pulley 132 and a second pulley 134 each may be attached to the tube 116 and positioned at least partially within the inner passage 120. As described below, the pulleys 132, 134 may guide the cable 180 into and out of the inner passage 120. In some embodiments, as shown, the first pulley 132 may be positioned closer to the bottom end 112 than the top end 114 of the post 110, and the second pulley 134 may be positioned closer to the top end 114 than the bottom end 112 of the post 110. In some embodiments, the first pulley 132 may extend through the first opening 122, and the second pulley 134 may extend through the second opening 124. In some embodiments, as shown, the first pulley 132 may be positioned along a back side of the tube 116, and the second pulley 134 may be positioned along an opposite front side of the tube 116.

A plurality of cable supports 136 also may be attached to the tube 116. As shown, the cable supports 136 may be positioned along the top end 114 of the post 110. As described below, the cable supports 136 may be configured to engage a cable 180 of another post assembly 100 that is received through the cutouts 136. The cable supports 136 may include smooth surfaces for engaging the cable 180 while minimizing wear or damage thereto.

As shown, the post plate 140 may be positioned at the bottom end 112 of the post 110 and attached to the tube 116. In some embodiments, the post plate 140 may be fixedly attached to the tube 116, for example, by welding. In other embodiments, the post plate 140 may be removably attached to the tube 116, for example, by one or more fasteners or other means of mechanical attachment. As shown, the post plate 140 may have a greater cross-sectional area than the tube 116. The post plate 140 may include a plurality of holes 142 extending therethrough to facilitate attachment of the post 110 to the base 150 and the counterweights 160 via respective fasteners 166. In some embodiments, the fasteners 166 may be nuts and bolts, screws, or other types of mechanical fasteners. In some embodiments, the fasteners 166 may be removable to facilitate disassembly of the post 110, the base 150, and the counterweights 160 from one another, for example to ease transport of the post assembly 100.

As shown, the base 150 may be attached to the bottom end 112 of the post 116 and may extend transverse to the post 116. The base 150 may include a plurality of holes 152 extending therethrough to facilitate attachment of the post 110 to the base 150 and the counterweights 160 via the fasteners 166. In some embodiments, the base 150 may be provided as, or may include, a base plate formed of a metal, such as a heavy metal capable of withstanding forces applied thereto during use without bending or deforming the base 150. As shown, the base plate may have a greater cross-sectional area than the post plate 140. In some embodiments, the base plate and the post plate 140 may have equal widths, but the base plate may have a greater length than the post plate 140. In some embodiments, as shown, the base 150 also may include a base layer 154 covering a bottom side of the base plate. The base layer 154 may provide a protective barrier to inhibit the metal base plate from directly contacting and potentially harming the floor of an indoor venue where the post assembly is used. In some embodiments, the base layer 154 may be formed of a suitable non-metal material, such as an elastomeric material, a plastic material, and the like.

As shown, the counterweights 160 may be provided as, or may include, a plurality of counterweight plates positioned between the post plate 140 and the base 150. Each counterweight 160 may include a plurality of holes 162 extending therethrough to facilitate attachment of the post 110 to the base 150 and the counterweights 160 via the fasteners 166. In some embodiments, each counterweight 160 may be provided as, or may include, a counterweight plate formed of a metal, such as a heavy metal capable of withstanding forces applied thereto during use without bending or deforming the counterweight 160. In some embodiments, as shown, the counterweight plate may have a cross-sectional area equal to that of the post plate 140.

The tension device 170 may be attached to the post 110. For example, as shown, the tension device 170 may be attached to the tube 116. In some embodiments, the tension device 170 may be fixedly attached to the tube 116. In some embodiments, the tension device 170 may be removably attached to the tube 116. In some embodiments, as shown, the tension device 170 may be attached to the back wall of the tube 116. As described below, the tension device 170 may be configured to adjust tension of the cable 180 between the post 110 and a post 110 of another post assembly 100. In some embodiments, the tension device 170 may be a winch, such as a manual winch or a powered winch, although other suitable mechanical devices for selectively adjusting tension of the cable 180 may be used in other embodiments.

The cable 180 may be a flexible cable capable of withstanding tension forces provided by the tension device 170. In some embodiments, the cable 180 may be formed of a metal, although other suitable materials may be used in other embodiments. In some embodiments, the metal may be covered with a coating to inhibit wear or damage to the cable 180. As shown, the cable 180 may include a first end portion 182 and a second end portion 184 disposed opposite one another along a length of the cable 180. The first end portion 182 may be configured to removably attach to a post 110 of another post assembly 100. For example, the first end portion may include a fitting, a fastener, or other mechanical feature configured for removably attaching to a mating feature of the post 110 of the other post assembly 100. The second end portion 184 may be attached to the tension device 170, either fixedly or removably. As shown, the cable 180 may extend through the inner passage 120 of the tube 116. For example, as shown, the cable 180 may extend from the tension device 170, through the first opening 122 into the inner passage 120, and through the second opening 124 out of the inner passage 120. In some embodiments, as shown, the cable 180 may extend from the tension device 170, around the first pulley 132, through the inner passage 120, and around the second pulley 134.

In some embodiments, as shown in FIGS. 6A-6C, the post assembly may include a pair of support arms 144 and a support tube 146 configured to guide and support a portion of the cable 180 extending away from the post 110. In some embodiments, the support arms 144 may be attached, either fixedly or removably, to the tube 116 and positioned around the second opening 124. As shown, the support arms 144 may extend transverse to the tube 116. In some embodiments, the support arms 144 may be integrally formed with one another as a generally V-shaped or U-shaped member. In some embodiments, the support arms may be rigid and may be formed of a metal, although other suitable materials may be used in other embodiments. The support tube 146 may be attached to the support arms 144 and may extend transverse to the tube 116. As shown, the cable 180 may extend through the support tube 146. In some embodiments, the support tube 146 may be formed of a flexible material, such as an elastomeric material or a plastic material, although other suitable materials may be used. In some embodiments, the support arms 144 and the support tube 146 may be omitted, such that the portion of the cable 180 extending away from the second pulley 134 is not guided or supported by other structure of the post assembly 100.

During use of the post assembly 100 as a starting post assembly 100a or a starting middle post assembly 100d, the free end portion 182 of the cable 180 may be extended away from the post 110 by releasing or actuating the tension device 170 and pulling the free end position 182. The free end portion 182 may be extended over a middle post assembly 100c or a starting middle post assembly 100d, if present in the arrangement of a camera mounting system, and then attached to an end post assembly 100b, as discussed above with respect to camera mounting systems 101, 102, 103, 104, 105. After attaching the free end portion 182 to the end post assembly 100b, the tension device 170 may be actuated to tension the cable 180 between the respective post assemblies. During use of the post assembly 100 as a middle post assembly 100c or a starting middle post assembly 100d, a cable 180 of another post assembly 100 (i.e., a starting post assembly 100a or a starting middle post assembly 100d) may be passed over the post 110 and through the cutouts 126 such that the cable supports 136 engage and support the portion of the cable 180 overlying the post 100. During use of the post assembly 100 as an end post assembly 100b, a cable 180 of another post assembly 100 (i.e., a starting post assembly 100a or a starting middle post assembly 100d) may be removably attached to the post assembly 100, such as the post 110 thereof, and tensioned between the post assembly and the other post assembly. As discussed above, certain components and/or features of the post assembly 100 may be omitted depending on the intended position of the post assembly 100 within an arrangement of the camera mounting system.

In some embodiments, as shown in FIGS. 1-5, the post assembly 100 may include one or more additional counterweights 168, which may be used in addition to or instead of the counterweights 160. As shown, the counterweights 168 may be positioned at least partially over the post plate 140, along the front side of the tube 116, although other positions of the counterweights 168 may be used. In some embodiments, the counterweights 168 may be removably attached to the post 110, such as the tube 116 thereof, for example, by one or more straps or other means of mechanical attachment. In some embodiments, the counterweights 168 may be provided as, or may include, fluid containers configured to contain a volume of fluid therein. In this manner, the counterweights 168 may be filled with a fluid, such as water, when being used as a part of the post assembly 100, and subsequently may be emptied of the fluid after use to ease transport of the counterweights 168. In other embodiments, the counterweights 168 may be solid objects formed of a metal or other suitable material.

In some embodiments, the respective features of the post assemblies 100 and the components thereof may have the relative dimensional relationships depicted in FIGS. 1-6S. Various other suitable relative dimensional relationships between respective features of the post assemblies 100 and the components thereof may be used in other embodiments.

Although specific embodiments of the disclosure have been described, one of ordinary skill in the art will recognize that numerous other modifications and alternative embodiments are within the scope of the disclosure. For example, while various illustrative implementations and structures have been described in accordance with embodiments of the disclosure, one of ordinary skill in the art will appreciate that numerous other modifications to the illustrative implementations and structures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. A camera mounting system comprising:
    a first post assembly that is self-standing in an upright position, the first post assembly comprising:
        a first post comprising a first tube extending between a bottom end and a top end of the first post; and
        a first base attached to the bottom end of the first post and extending transverse to the first post; and
    a second post assembly that is self-standing in an upright position and movable relative to the first post assembly, the second post assembly comprising:
        a second post comprising a second tube extending between a bottom end and a top end of the second post;
        a second base attached to the bottom end of the second post and extending transverse to the second post;
        a post plate positioned at the bottom end of the second post and attached to the second tube wherein the post plate has a greater cross-sectional area than the second tube,
        a first tension device attached to the second post; and
        a first cable configured to extend between the second post and the first post, the first cable comprising a first end portion configured to removably attach to the first post assembly and a second end portion attached to the first tension device;
        wherein the first tension device is configured to adjust tension of the first cable between the second post and the first post.

2. The camera mounting system of claim 1, wherein the second tube comprises an inner passage extending therethrough, and wherein the first cable extends through the inner passage.

3. The camera mounting system of claim 2, wherein the second tube further comprises a first opening and a second opening each in communication with the inner passage, and wherein the first cable extends from the first tension device, through the first opening into the inner passage, and through the second opening out of the inner passage.

4. The camera mounting system of claim 3, wherein the first opening is positioned closer to the bottom end than the top end of the second post, and wherein the second opening is positioned closer to the top end than the bottom end of the second post.

5. The camera mounting system of claim 3, wherein the second post assembly further comprises a first pulley and a second pulley each attached to the second tube and positioned at least partially within the inner passage, and wherein the first cable extends from the first tension device, around the first pulley, and around the second pulley.

6. The camera mounting system of claim 5, wherein the first pulley is positioned closer to the bottom end than the top end of the second post, and wherein the second pulley is positioned closer to the top end than the bottom end of the second post.

7. The camera mounting system of claim 5, wherein the first pulley extends through the first opening, and wherein the second pulley extends through the second opening.

8. The camera mounting system of claim 5, wherein the first pulley is positioned along a first side of the second tube, and wherein the second pulley is positioned along an opposite second side of the second tube.

9. The camera mounting system of claim 3, wherein the second post assembly further comprises:
    a pair of support arms attached to the second tube and positioned about the second opening, the support arms extending transverse to the second tube; and
    a support tube attached to the support arms, the first cable extending through the support tube.

10. The camera mounting system of claim 1, wherein the second base comprises a base plate attached to the post plate by a plurality of fasteners, and wherein the base plate has a greater cross-sectional area than the post plate.

11. The camera mounting system of claim 10, wherein the second post assembly further comprises a plurality of counterweights attached to the second post.

12. The camera mounting system of claim 11, wherein the plurality of counterweights comprises a plurality of counterweight plates positioned between the post plate and the base plate and attached to the post plate by a plurality of fasteners.

13. The camera mounting system of claim 11, wherein the plurality of counterweights comprises a plurality of fluid containers positioned at least partially over the post plate.

14. The camera mounting system of claim 1, wherein the second post assembly further comprises a plurality of cable supports attached to the second tube and positioned along the top end of the second post, the cable supports configured to engage a second cable.

15. The camera mounting system of claim 14, wherein the plurality of cable supports comprises a plurality of cylindrical pins.

16. The camera mounting system of claim 1, wherein the first tension device comprises a winch.

17. The camera mounting system of claim 1, further comprising a plurality of cameras, each camera configured to attach to the first cable at a fixed location along the first cable between the second post and the first post.

18. The camera mounting system of claim 1, further comprising a third post assembly that is self-standing in an upright position and movable relative to each of the first post assembly and the second post assembly such that the third post assembly is positioned between the first post assembly and the second post assembly, the third post assembly comprising:
    a third post comprising a third tube extending between a bottom end and a top end of the third post;
    a third base attached to the bottom end of the third post and extending transverse to the third post; and
    a plurality of cable supports attached to the third tube and positioned along the top end of the third post, the cable supports configured to engage the first cable of the second post assembly while the first cable extends between the second post and the first post.

19. The camera mounting system of claim 18, wherein the third post assembly further comprises:
   a second tension device attached to the third post; and
   a second cable configured to extend between the third post and a fourth post of a fourth post assembly, the second cable comprising a first end portion configured to removably attach to the fourth post assembly and a second end portion attached to the second tension device;
   wherein the second tension device is configured to adjust tension of the second cable between the third post and the fourth post.

* * * * *